United States Patent
Oshima

(10) Patent No.: US 8,056,896 B2
(45) Date of Patent: *Nov. 15, 2011

(54) IMAGE SCANNING APPARATUS AND IMAGE SCANNER

(75) Inventor: Osamu Oshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 923 days.

This patent is subject to a terminal disclaimer.

(21) Appl. No.: 12/043,216

(22) Filed: Mar. 6, 2008

(65) Prior Publication Data

US 2008/0226371 A1 Sep. 18, 2008

(30) Foreign Application Priority Data

Mar. 15, 2007 (JP) ................. 2007-067358

(51) Int. Cl.
*B65H 1/18* (2006.01)
*B65H 1/00* (2006.01)

(52) U.S. Cl. ........ 271/162; 271/152; 271/153; 271/154; 399/361; 399/367; 358/498; 358/496

(58) Field of Classification Search ............... 358/498, 358/496; 399/397, 367, 361, 371; 271/162, 271/152–155
See application file for complete search history.

(56) References Cited

U.S. PATENT DOCUMENTS

| | | | |
|---|---|---|---|
| 5,295,678 A | 3/1994 | Lindner et al. | |
| 5,397,118 A * | 3/1995 | Iida et al. | 271/155 |
| 5,887,867 A | 3/1999 | Takahashi et al. | |
| 5,988,628 A | 11/1999 | Mori | |
| 7,654,517 B2 * | 2/2010 | Oshima | 271/152 |
| 2005/0206972 A1 | 9/2005 | Shimizu | |
| 2005/0225022 A1 | 10/2005 | Akiyama et al. | |
| 2008/0224391 A1 * | 9/2008 | Oshima | 271/265.01 |

FOREIGN PATENT DOCUMENTS

| | | |
|---|---|---|
| JP | 07-157099 A | 6/1995 |
| JP | 08-002702 A | 1/1996 |
| JP | 8-290841 A | 11/1996 |
| JP | 9-25013 A | 1/1997 |
| JP | 11-091955 A | 4/1999 |
| JP | 11-208930 A | 8/1999 |
| JP | 2000-095359 A | 4/2000 |
| JP | 2004-345865 A | 12/2004 |
| JP | 2005-112558 A | 4/2005 |

(Continued)

OTHER PUBLICATIONS

Official communication issued in counterpart Japanese Application No. 2007-067358, mailed on Jan. 9, 2009.

(Continued)

*Primary Examiner* — Cheukfan Lee
(74) *Attorney, Agent, or Firm* — Keating & Bennett, LLP

(57) ABSTRACT

In an image scanning apparatus, documents on a document tray are transferred one by one, and an upper surface height of the documents is lowered to turn off a height detection sensor. Different kinds of control modes are performed according to a document scanning mode. In an image-quality-priority scanning mode, a transfer unit suspends transfer of the document, the document tray is elevated until the upper surface height reaches a target height that is higher by a predetermined distance after the height detection sensor is turned on, and the transfer unit resumes the transfer of the document. In a speed-priority scanning mode, while the transfer of the document is continued by the transfer unit, the document tray is elevated until the document tray reaches the target height.

4 Claims, 7 Drawing Sheets

FOREIGN PATENT DOCUMENTS

JP         2006-016093 A      1/2006

OTHER PUBLICATIONS

Official Communication issued in corresponding European Patent Application No. 08001958.1, mailed on Nov. 19, 2009.

Oshima; "Image Scanning Apparatus and Image Scanner"; U.S. Appl. No. 12/018,862, filed Jan. 24, 2008.

Oshima; "Image Scanning Apparatus and Image Scanner"; U.S. Appl. No. 12/031,742, filed Feb. 15, 2008.

* cited by examiner

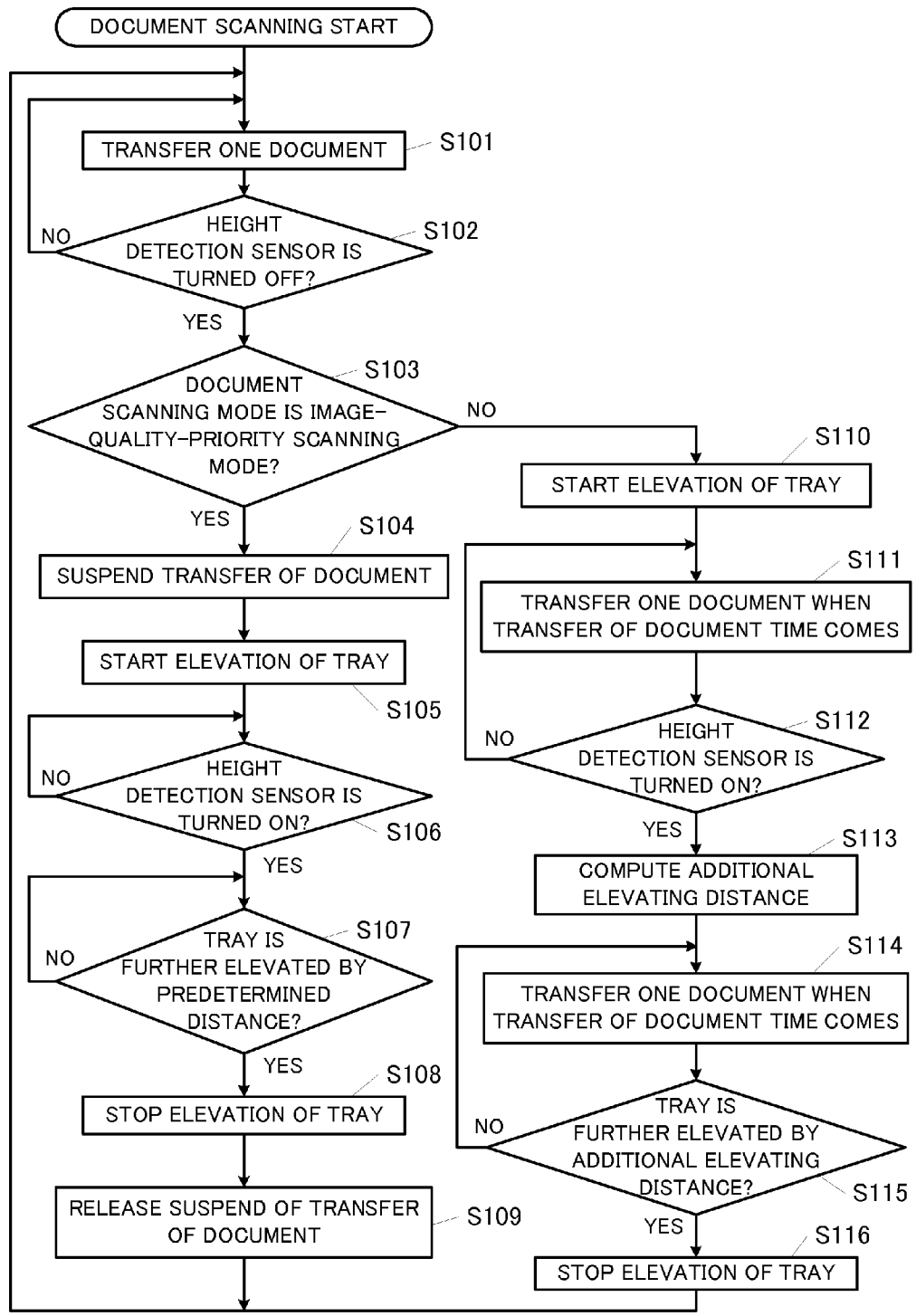

IMAGE SCANNING APPARATUS AND IMAGE SCANNER

CROSS-REFERENCE TO RELATED APPLICATIONS

This application claims priority under 35 U.S.C. 119 to Japanese Patent Application No. 2007-67358, filed on Mar. 15, 2007, which application is hereby incorporated by reference in its entirety.

BACKGROUND OF THE INVENTION

1. Field of the Invention

The present invention relates to a configuration of an image scanning apparatus suitably used to place and scan a large amount of documents.

2. Description of the Related Art

For example, Japanese patent Laid-Open application publication No. 2006-16093 discloses a copying machine which includes an upper-limit position detection sensor for detecting a topmost document while being able to accommodate plural documents on a document tray (document feeder tray). In the copying machine disclosed in Japanese patent Laid-Open application publication No. 2006-16093, when the number of documents is decreased as the documents on the document tray are fed, a control device controls a tray driving mechanism to always keep the topmost document at the same position with respect to a pickup roller according to a detection result of the upper limit position detection sensor. Therefore, the topmost document is always located at a position where the document can be fed.

In the large-capacity image scanning apparatus disclosed in Japanese patent Laid-Open application publication No. 2006-16093, with the increasing need for fast copying of a large amount of documents, there is a strong demand to perform high-speed scanning while maintaining the scanning image quality.

However, in Japanese patent Laid-Open application publication No. 2006-16093, there is no description concerning the timing for controlling the tray driving mechanism to lift and lower the document tray. Accordingly, in Japanese Patent Publication Laid-Open No. 2006-16093, when the document tray is elevated during scanning of the document, the document is moved by an elevation of the document tray during transportation of the document, resulting in the deterioration of the scanning image quality. In particular, the apparatus disclosed in Japanese Patent Publication Laid-Open No. 2006-16093 is not suitable in the case where the scanning is performed to emphasize image quality.

SUMMARY OF THE INVENTION

In order to overcome the problems described above, preferred embodiments of the present invention provide a document tray elevation control which is provided for both the case in which the scanning is performed based on the image quality and the case in which the scanning is performed quickly.

Preferred embodiments of the present invention for overcoming the problems described above will be described below.

A preferred embodiment of the present invention provides an image scanning apparatus including a document tray arranged to receive a plurality of documents with the documents overlapped; an image scanning unit arranged to scan the documents; a transfer unit arranged to transfer the documents on the document tray one by one toward the image scanning unit; a lifting and lowering device arranged to lift and lower the document tray; a height detection sensor arranged to detect an upper surface height of the documents stacked on the document tray; and a control unit arranged to control the lifting and lowering device. The control unit can control the lifting and lowering device while switching between a first control mode and a second control mode. In the first control mode, when the height detection sensor detects that the transfer unit transfers a document to lower the upper surface height below a predetermined height, the control unit suspends the transfer of the document by the transfer unit, the control unit elevates the document tray until the upper surface height reaches a target height that is higher by a predetermined distance than when the height detection sensor initially detects that the upper surface height becomes higher than the predetermined height, and the control unit resumes the transfer of the document by the transfer unit. In the second control mode, the control unit elevates the document tray until the document tray reaches the target height, while the transfer unit continues the transfer of the document.

Accordingly, the document tray can be elevated by selecting the control mode from the two control modes, i.e., the first control mode in which the transfer (image scanning) of the document is suspended and the transfer (scanning) is resumed after the document tray is elevated, and the second control mode in which the document tray is elevated while the transfer (image scanning) of the document is continued. As a result, the document tray can properly be elevated according to the appropriate circumstances.

In the image scanning apparatus according to the first preferred embodiment of the present invention, a document scanning mode can preferably be switched between an image-quality-priority scanning mode and a speed-priority scanning mode as a mode for scanning the document. In the image-quality-priority scanning mode, the control unit controls the lifting and lowering device in the first control mode, and in the speed-priority scanning mode the control unit controls the lifting and lowering device in the second control mode.

Accordingly, in the image-quality-priority scanning mode, the document tray can be elevated in the first control mode such that the elevation of the document tray does not adversely affect the image quality in scanning the document. On the other hand, in the speed-priority scanning mode, the document tray is elevated in the second control mode, so that the document can be efficiently scanned to complete the scanning work in a short time.

In the image scanning apparatus according to the first preferred embodiment of the present invention, preferably in the case where the height detection sensor detects that the transfer unit transfers the document to lower the upper surface height below a predetermined height in the second control mode, when the height detection sensor detects that the upper surface height becomes higher than the predetermined height, the control unit further elevates the document tray by a predetermined additional elevating distance from that time, and the control unit controls the lifting and lowering device such that the upper surface height reaches the target height. The additional elevating distance is determined according to a document scanning speed.

Therefore, in the second control mode, because the number of documents transferred during the elevation of the document tray depends on the document scanning speed, the additional elevating distance can be determined according to the number of documents. Accordingly, the upper surface height of the documents is substantially elevated to the target height irrespective of the document scanning speed, which allows the transfer unit to smoothly transfer the documents.

In accordance with another preferred embodiment of the present invention, an image scanner is provided as the image scanning apparatus.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 is a flowchart illustrating elevation control of the document tray.

DETAILED DESCRIPTION OF PREFERRED EMBODIMENTS

Figure 1:
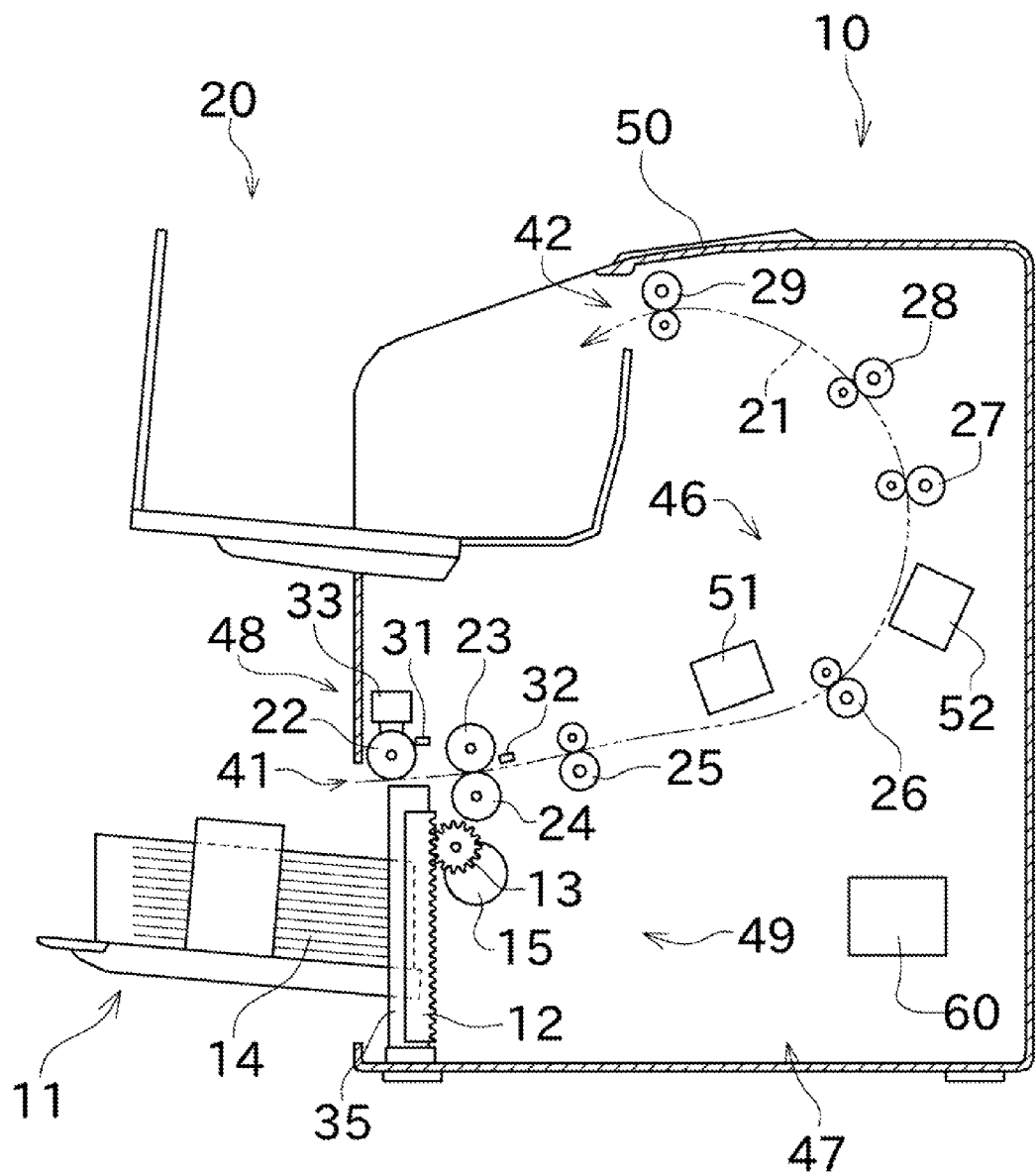
FIG. 1 is a sectional side view illustrating an entire configuration of an image scanner according to a preferred embodiment of the present invention.
Figure 2:
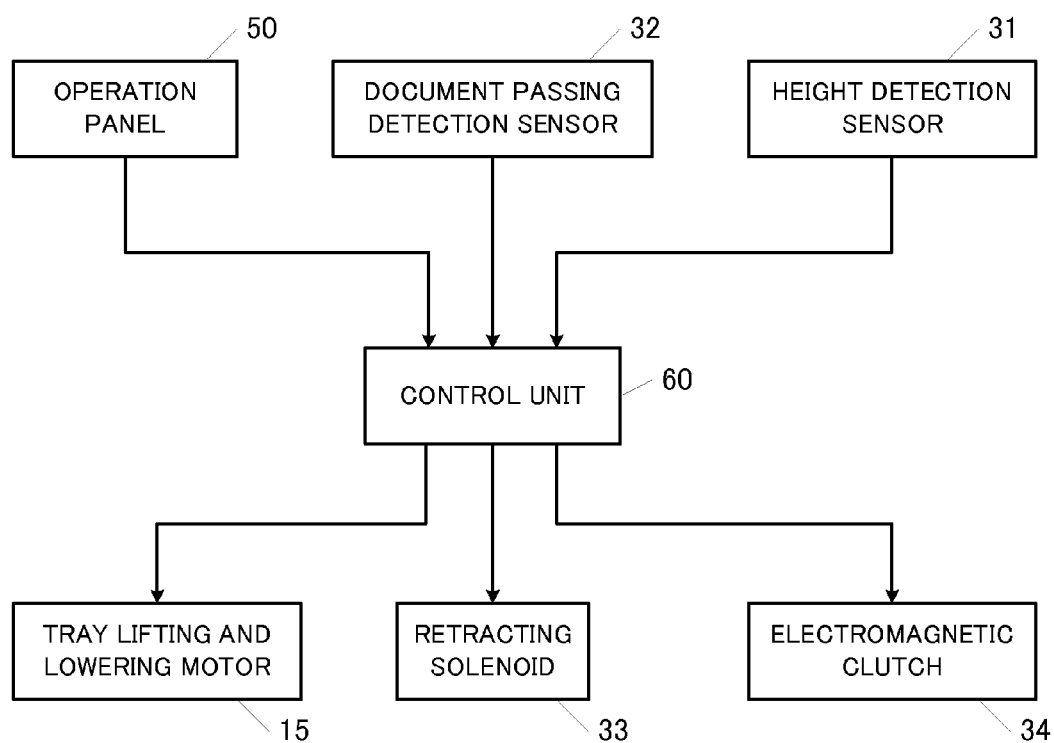
FIG. 2 is a block diagram illustrating a portion of an electronic configuration of the image scanner.
Figure 3:
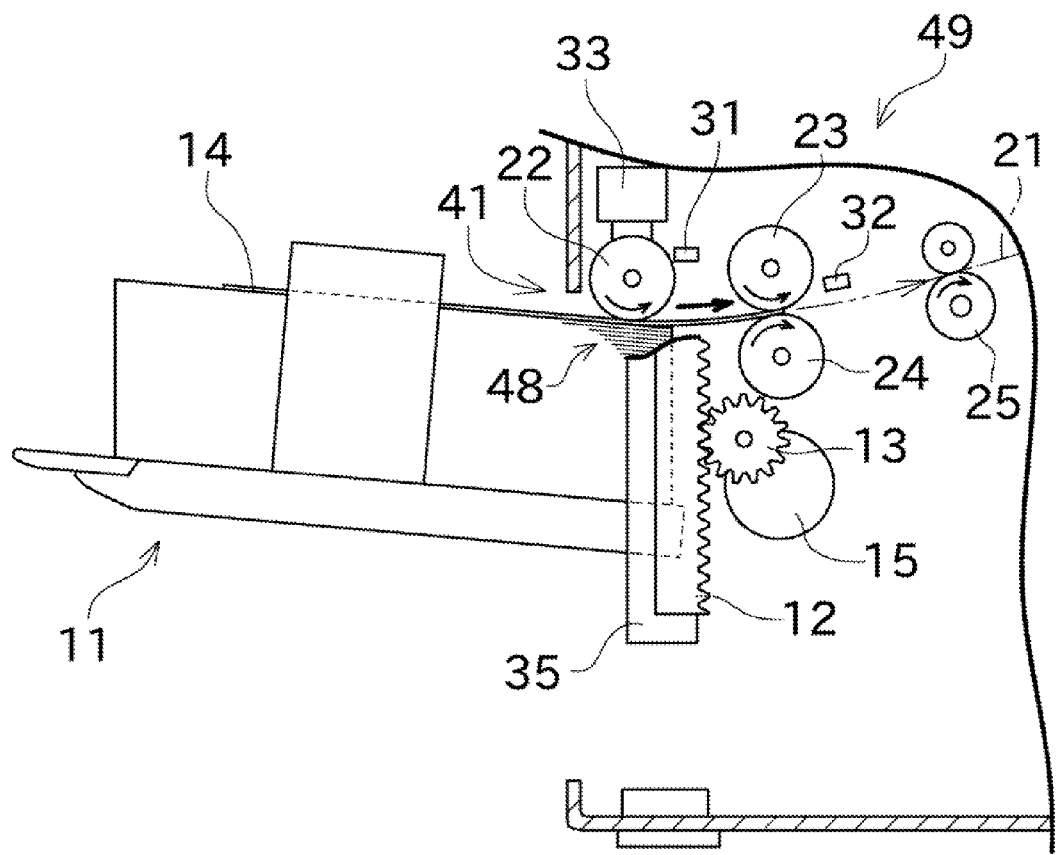
FIG. 3 is an enlarged sectional side view illustrating a state in which a transfer unit is driven to transfer a topmost document into a document transportation path.
Figure 4:
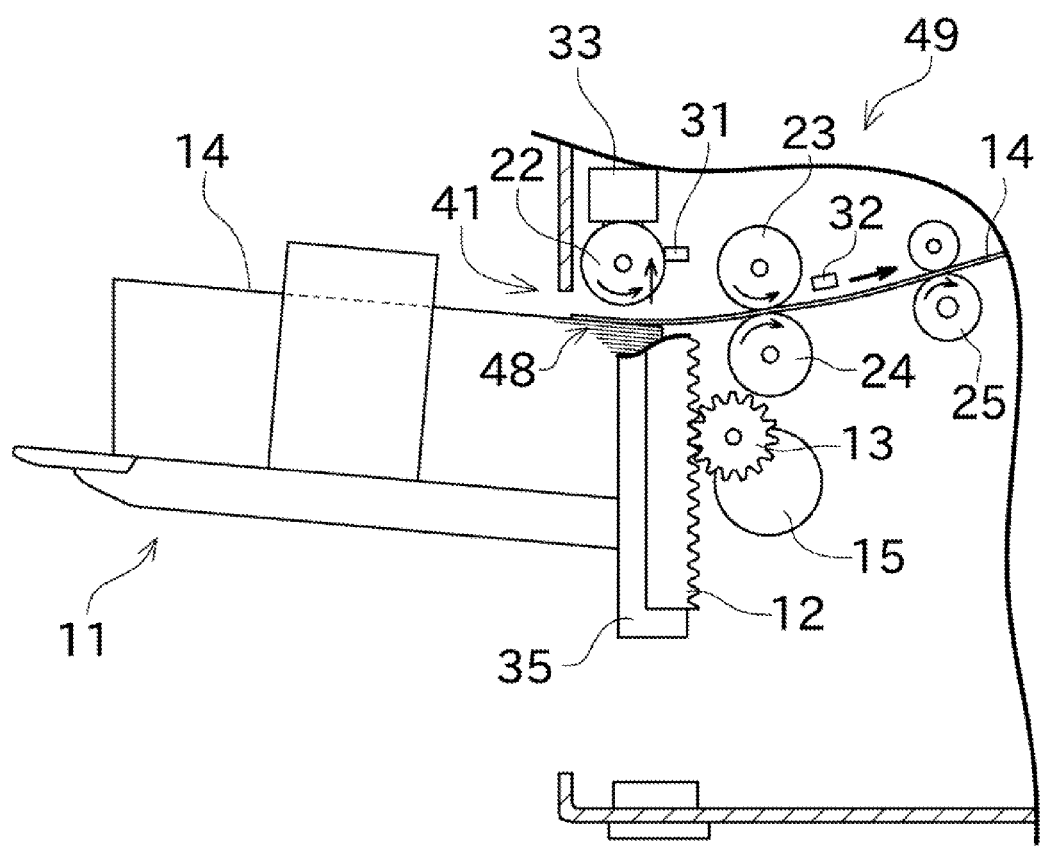
FIG. 4 is an enlarged sectional side view illustrating a state in which a pickup roller is retracted upward immediately before the transfer of the topmost document is completed.
Figure 5:
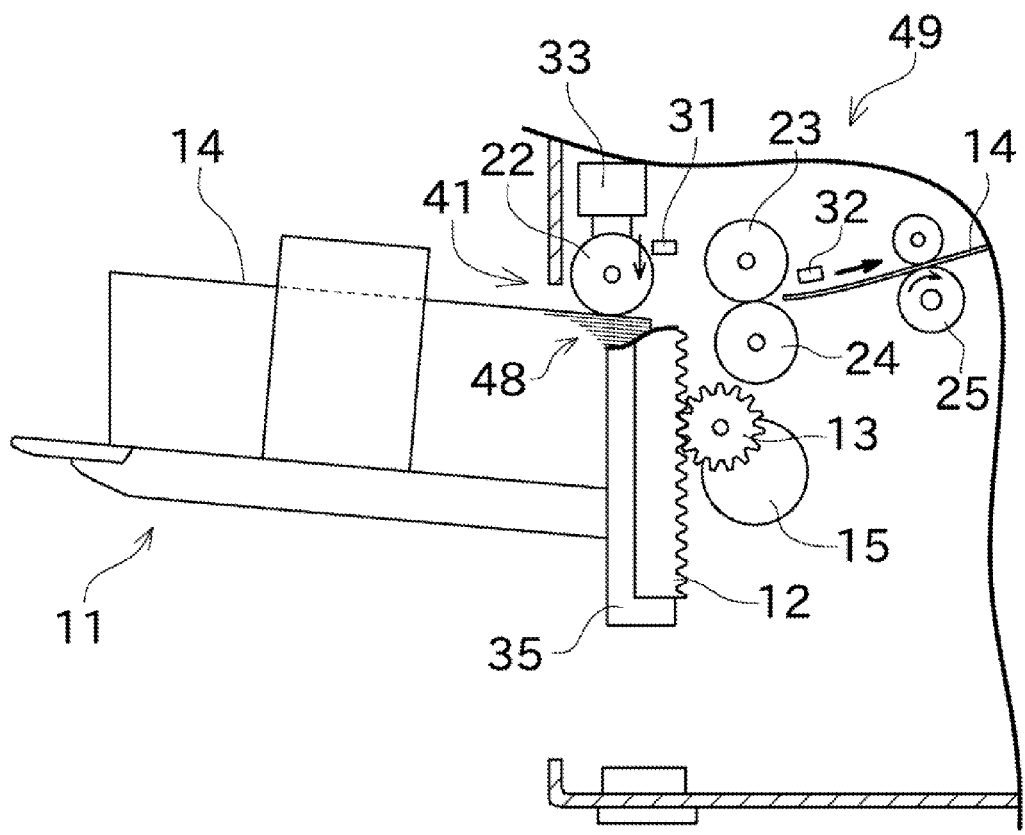
FIG. 5 is an enlarged sectional side view illustrating a state in which the transfer is completed to lower the pickup roller again.
Figure 6:
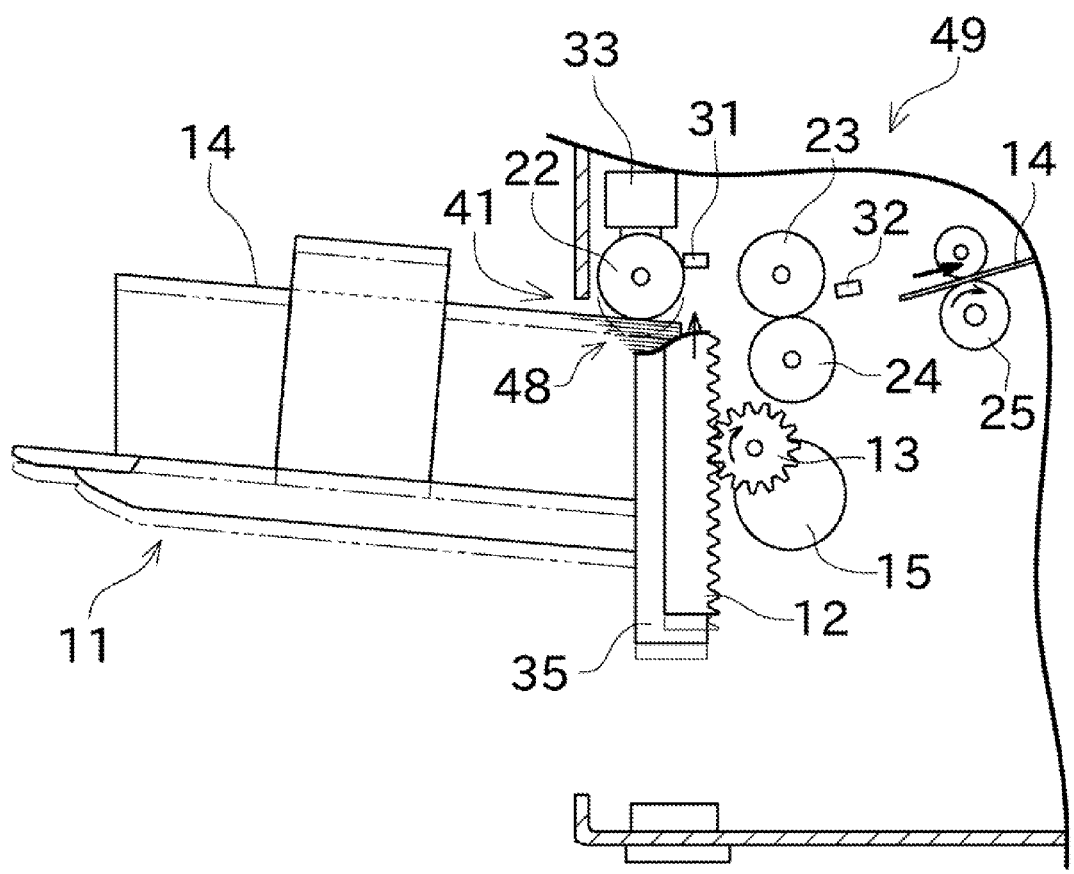
FIG. 6 is an enlarged sectional side view illustrating a state in which a document tray is elevated.

Preferred embodiments of the present invention will be described below. FIG. 1 is a sectional side view illustrating an entire configuration of an image scanner according to a preferred embodiment of the present invention, and FIG. 2 is a block diagram illustrating a portion of an electronic configuration of the image scanner. FIG. 3 is an enlarged sectional side view illustrating a state in which a transfer unit is driven to transfer a topmost document into a document transportation path. FIG. 4 is an enlarged sectional side view illustrating a state in which a pickup roller is retracted upward immediately before the transfer of the topmost document is completed. FIG. 5 is an enlarged sectional side view illustrating a state in which the transfer is completed to lower the pickup roller again. FIG. 6 is an enlarged sectional side view illustrating a state in which a document tray is elevated. FIG. 7 is a flowchart illustrating document tray elevation control.

As illustrated in FIG. 1, an image scanner 10 is an image scanning apparatus according to a preferred embodiment of the present invention. A large-capacity document tray 11 in which documents 14 are placed is provided in a lower portion of a main body of the image scanner 10, and a discharge tray 20 in which the scanned documents 14 are stacked is provided in an upper portion of the main body of the image scanner 10.

The image scanner 10 includes a document feeding port 41 which feeds the documents 14 from the document tray 11 to the inside of the main body and a document discharge port 42 which discharges the documents 14 to the discharge tray 20 after an image of the document 14 is scanned inside the main body.

A curved document transportation path 21 connecting the document feeding port 41 and the document discharge port 42 is arranged in the main body of the image scanner 10, and transportation rollers 25, 26, 27, 28, and 29 are disposed along the document transportation path 21. Two image sensors 51 and 52 are disposed at a midpoint of the document transportation path 21 so as to face the front and back of the document 14, and the image sensors 51 and 52 scan the front and back of the document 14 passing through the document transportation path 21. An operation panel 50 is provided on an upper portion of the image scanner 10. The user can give an instruction for a document scanning mode (image-quality-priority scanning mode/speed-priority scanning mode), resolution in scanning the document, or start/stop of the image scanning to the apparatus through the operation panel 50.

The image scanner 10 includes an image scanning unit 46 arranged to scan the document 14 and a document transportation device 47 arranged to transport the document 14. The document transportation device 47 includes the transportation rollers 25 to 29 and an electric motor (driving source, not illustrated) which drives the transportation rollers 25 to 29. The document transportation device 47 transports the document 14 on the document tray 11 from the document feeding port 41 to the image scanning unit 46, and the document transportation device 47 discharges the document 14 from the document discharge port 42 toward the discharge tray 20 after the document 14 passes through the image scanning unit 46.

The image scanner 10 includes the document tray 11 and a transfer unit 48. The transfer unit 48 transfers and separates the documents 14 one by one, and the transfer unit 48 transports the documents 14 from document feeding port 41. The transfer unit 48 includes a pickup roller 22, a separation roller 23, and a retard roller 24. The pickup roller 22 transfers the document 14 to the document feeding port 41 by contacting an upper surface of a topmost document 14 stacked on the document tray 11. The separation roller 23 is disposed on a downstream side of the pickup roller 22 in a document transportation direction. The retard roller 24 is disposed opposite the separation roller 23.

A guide rail (not illustrated) is vertically provided at an appropriate position of the image scanner 10, and a lifting and lowering frame 35 is able to be lifted and lowered along the guide rail. Because the document tray 11 is attached to the lifting and lowering frame 35, the document tray 11 can vertically be moved along with the lifting and lowering frame 35.

A lower-limit position (illustrated in FIG. 1) of a lifting stroke of the document tray 11 is a document setting position where the documents are placed on the document tray 11. On the other hand, a position (illustrated in FIG. 3) which is located above the document setting position and in which the topmost document 14 can contact the pickup roller 22 is a separation position where the documents 14 can individually be separated by the transfer unit 48 and fed toward the document transportation path 21.

As illustrated in FIG. 1, for example, the document transportation device 47 includes a lifting and lowering device 49 arranged to lift and lower the document tray 11. The lifting and lowering device 49 includes a tray lifting and lowering motor 15 preferably in the form of an electric motor, a pinion (gear) 13 driven by the tray lifting and lowering motor 15, and a rack 12 engaging the pinion 13. The tray lifting and lowering motor 15 is preferably a stepping motor.

The rack 12 is fixed to the lifting and lowering frame 35, and the rack 12 is vertically moved along with the lifting and lowering frame 35 and the document tray 11.

The pickup roller 22 is arranged above the document tray 11 so as to face the document tray 11, and the pickup roller 22 is supported while being able to be lifted and lowered. The pick up roller 22 is biased downward by a spring (not illustrated) such that the pickup roller 22 can be pressed against the upper surface of the topmost document 14.

A height detection sensor 31 arranged to detect a height of the pickup roller 22 is provided in the transfer unit 48. In the state in which the pickup roller 22 contacts the topmost document 14, the height of the pickup roller 22 can be detected by the height detection sensor 31 to detect the height of the upper surface (upper surface height) of the stacked documents 14.

For example, the height detection sensor 31 may be a photosensor. The height detection sensor 31 is turned on when the height of the pickup roller 22 (upper surface height of the document 14) exceeds a predetermined height, and the height detection sensor 31 is turned off when the height of the pickup roller 22 is lower than the predetermined height. The predetermined height is set to be a height at which the pickup roller 22 is slightly elevated by the upper surface of the topmost document 14. As illustrated in FIG. 2, the height detection sensor 31 is electrically connected to a control unit 60, so that the height detection sensor 31 can transmit a signal of the on/off state to the control unit 60.

As illustrated in FIG. 1, a retracting solenoid 33 is coupled to the pickup roller 22, and the pickup roller 22 can be retracted upward at an appropriate timing and forceably separated from the upper surface of the document 14. As illustrated in FIG. 2, the retracting solenoid 33 is connected to the control unit 60.

The pickup roller 22, the separation roller 23, and the retard roller 24 are coupled to an electric motor which is the driving source of the document transportation device 47 through the electromagnetic clutch 34. The electromagnetic clutch 34 is electrically connected to the control unit 60.

As illustrated in FIG. 1, a document passing detection sensor 32 including a photosensor is disposed on the downstream side of the separation roller 23 in the document transportation direction. The document passing detection sensor 32 is turned on when detecting the document immediately after the document passes through a nip position between the separation roller 23 and the retard roller 24, and the document passing detection sensor 32 is turned off in other cases. As illustrated in FIG. 2, the document passing detection sensor 32 is electrically connected to the control unit 60.

The image scanner 10 preferably includes a microcomputer type control unit 60. As illustrated in FIG. 2, the tray lifting and lowering motor 15 and the operation panel 50 are electrically connected to the control unit 60.

In the image scanner 10 having the above-described configuration, an operator stacks the overlapped documents 14 on the document tray 11 which is the document setting position as illustrated in FIG. 1, and the operator provides the operation panel 50 (or personal computer) with an instruction to start the scanning, thereby transmitting a scanning start signal to the control unit 60.

When the control unit 60 receives the scanning start signal, the control unit 60 turns off the retracting solenoid 33 to lower the pickup roller 22, and the scanning start signal starts the driving of the tray lifting and lowering motor 15. Therefore, the tray lifting and lowering motor 15 is driven to rotate the pinion 13, and an upward force acts on the rack 12 engaging the pinion 13. This enables the document tray 11 to be elevated along the guide rail from the document setting position.

The control unit 60 monitors the state of the height detection sensor 31 during the driving of the tray lifting and lowering motor 15. The upper surface of the document 14 elevated by the document tray 11 contacts and elevates the pickup roller 22. The control unit 60 transmits a driving pulse to the tray lifting and lowering motor 15 to elevate the document tray 11 until the pickup roller 22 reaches a predetermined height to turn on the height detection sensor 31. Even after the height detection sensor 31 is turned on, the control unit 60 further drives the tray lifting and lowering motor 15 until the document tray 11 is elevated by a predetermined height. The control unit 60 can control the predetermined height elevation of the document tray 11 by transmitting a predetermined number of driving pulses to the tray lifting and lowering motor 15 which is preferably a stepping motor.

After the document tray 11 is elevated to the separation position shown in FIG. 3, the tray lifting and lowering motor 15 is stopped to immediately start the driving of the transfer unit 48. Specifically, the control unit 60 connects the electromagnetic clutch 34 (FIG. 2) to start the driving of the pickup roller 22, separation roller 23, and retard roller 24. Then, the pickup roller 22 transfers the topmost document 14 as illustrated in FIG. 3, and the document is fed to the document transportation path 21 through the document feeding port 41 while the separation roller 23 and the retard roller 24 separate the documents 14 one by one.

In feeding the document, the control unit 60 monitors the state of the document passing detection sensor 32. When the document passing detection sensor 32 detects the topmost document 14 is being fed to the downstream side by the separation roller 23 and the retard roller 24, the control unit 60 turns on the retracting solenoid 33 to retract the pickup roller 22 upward as illustrated in FIG. 4. Therefore, continuously irregular transfer can be prevented in the previous and subsequent documents 14.

The transportation rollers 25 to 29 (FIG. 1) transport the document 14 through the document transportation path 21, and the image sensors 51 and 52 scan the front and back of the document 14. An appropriate conversion process is performed to the data obtained by the scanning, and the converted data is transmitted through a communication cable (not illustrated) to a personal computer which is a higher order apparatus connected to the image scanner 10. The scanned document 14 is delivered along the document transportation path 21 to the discharge tray 20.

The control unit 60 measures an elapsed time using a timer circuit (not illustrated) since the document passing detection sensor 32 is turned on by detecting the document 14. When a predetermined time elapses, the document 14 passes through the nip portion between the separation roller 23 and the retard roller 24, and the document 14 is assumed to be retained by the transportation roller 25 or the like on the downstream side. Therefore, the control unit 60 releases the connection of the electromagnetic clutch 34 to stop the driving of the pickup roller 22, separation roller 23, and retard roller 24 as illustrated in FIG. 5. The control unit 60 turns off the retracting solenoid 33 immediately after stopping the driving of the pickup roller 22, separation roller 23, and retard roller 24, and the control unit 60 lowers the pickup roller 22 to bring the pickup roller 22 into contact with the topmost document 14.

Then, the control unit 60 monitors the state of the document passing detection sensor 32. After the transferred document 14 passes through the document passing detection sensor 32, when a predetermined time elapses since the document passing detection sensor 32 is turned off, the control unit 60 connects the electromagnetic clutch 34 again as illustrated in FIG. 3, and the control unit 60 transfers the next document 14 using the pickup roller 22. While a constant interval is ensured between the document 14 and the subsequent document 14, the documents 14 are supplied one by one to the document transportation path 21 by the repetition of the operations (FIGS. 3 to 5) until all documents 14 placed on the document tray 11 are gone, and the document 14 can be scanned using the image scanning unit 46.

When the documents 14 on the document tray 11 are sequentially delivered by the transfer unit 48, a remaining amount of documents 14 is gradually decreased, which lowers the upper surface height of the document 14. In the present preferred embodiment, by the following control of the tray elevation, the state in which the pickup roller 22 can transfer the document 14 is maintained irrespective of the remaining amount of documents 14, and the documents 14 can sequentially be transported until the large amount of documents 14 placed on the document tray 11 are gone.

The control of the elevation of the document tray 11 will be described in detail with reference to FIG. 7. As illustrated in the flowchart of FIG. 7, when the document scanning is started, the document tray 11 is elevated to the separation position as described above, and one document 14 is transferred (S101) The transfer operation is described above with reference to FIGS. 3 to 5. In the state of FIG. 5, the state of the height detection sensor 31 is checked in each transfer of the one document at a time (hereinafter referred to as "inter-transfer time") until the transfer of the next document is started since the transfer of the previous document is completed (S102 of FIG. 7). In the case where the height detection sensor 31 is turned on, the upper surface height of the document 14 has not been lowered much, the flow returns to the step of S101 to repeat the transfer of the documents 14 one by one.

When the height detection sensor 31 is turned off, it is checked in S103 whether or not the document scanning mode provided to the image scanner 10 is the image-quality-priority scanning mode.

When the document scanning mode is the image-quality-priority scanning mode, the transfer unit 48 suspends the transfer of the document 14 (S104). Accordingly, even if the transfer of the previous document 14 is completed, and the timing for transferring the next document 14 comes after the suspension of the transfer of the document 14, the control performed is such that the operation of the pickup roller 22 of the transfer unit 48 is prohibited.

After the transfer is tentatively interrupted, the control unit 60 immediately drives the tray lifting and lowering motor 15 to start the elevation of the document tray 11 (S105). The document tray 11 is elevated until the height detection sensor 31 is turned on (S106). Then, the document tray 11 is further elevated by a predetermined distance (predetermined pulses of the motor) even after the height detection sensor 31 is turned on (S107). When the document tray 11 is elevated by the predetermined distance, the tray lifting and lowering motor 15 is stopped to stop the document tray 11 (S108). In the following description, the upper surface height of the documents 14 at that time may be referred to as the "target height".

After the document tray 11 is elevated, the control unit 60 releases the suspension of the transfer of the document (S109), the flow returns to S101, and the one-by-one transfer of the documents is resumed while the document tray 11 is kept stationary.

That is, in the image-quality-priority scanning mode in which a higher priority is given to the scanning image quality in the image scanning unit 46, the transfer and scanning of the document 14 are suspended, the document tray 11 is elevated at one time until the upper surface height of the document 14 reaches the target height, and the suspension of the transfer of the document (scanning) is released after the document tray 11 is kept stationary. Therefore, during scanning of the document 14 with the image sensors 51 and 52, it can be avoided that the document tray 11 is moved which might adversely affect the image scanning, thereby achieving good scanning image quality.

On the other hand, when the document scanning mode is not the image-quality-priority scanning mode (in the case of the speed-priority scanning mode) in the determination in S103, the elevation of the document tray 11 is started (S110) while the transfer of the document 14 is not suspended. In the speed-priority scanning mode, even if the document tray 11 is being elevated, the documents 14 are transferred one by one when the timing of transfer of the document 14 occurs (S111). Then, the state of the height detection sensor 31 is checked (S112). When the height detection sensor 31 is turned off, the flow returns to S111. Through the sequence in S111 and S112, the document tray 11 is elevated while the document 14 is repeatedly transferred one by one until the height detection sensor 31 is turned on.

When the height detection sensor 31 is turned on, an additional elevating distance of the document tray 11 is computed (S113). The additional elevating distance is set as a distance in which the document tray 11 should be elevated from the time the height detection sensor 31 is turned on in order to ensure that the upper surface height of the document 14 reaches the target height.

While the document tray 11 is continuously elevated, the documents 14 are transferred one by one at the time when the timing of the transfer of the document occurs (S114). It is checked whether or not the total elevating distance of the document tray 11 reaches the additional elevating distance from the time in S113 (S115). When the total elevating distance of the document tray 11 does not reach the additional elevating distance, the flow returns to S114. Through the sequence in S114 and S115, the document tray 11 is elevated by the additional elevating distance while the documents 14 are repeatedly transferred one by one.

As described above, in the loop of S114 and S115, because the document 14 is appropriately transferred even in the middle of the elevation of the document tray 11, the stacking height of the documents 14 is decreased by the transfer of the document 14. In the present preferred embodiment, during computing of the additional elevating distance in S113, even if the document 14 is transferred in the middle of the elevation of the document tray 11, the computation is performed in consideration of the decrease in the stacking height caused by the transfer of the documents 14 such that the upper surface height of the document 14 is substantially elevated to the necessary position.

In the case of the fast scanning speed of the document 14, it is predicted that many documents 14 are transferred during elevation of the document tray 11, so that the additional elevating distance is set to be larger. On the contrary, in the case of the slow scanning speed of the document 14, it is predicted that few documents 14 are transferred during elevation of the document tray 11, so that the additional elevating distance is set to be smaller. Thus, the additional elevating distance computed through the processing in S113 depends on the inputted document scanning speed.

When the document tray 11 is elevated by the additional elevating distance computed in the above-described manner, the flow goes through the loop in S114 and S115 and to S116, and the elevation of the document tray 11 is stopped. Then, the flow returns to S101, the one-by-one transfer of the documents is resumed while the document tray 11 is kept stationary.

In the speed-priority scanning mode, the document tray 11 is elevated while the transfer (image scanning) of the documents 14 is continued. Accordingly, the document 14 is scanned even during elevating the document tray 11, so that the scanning work can efficiently be performed to digitize a large amount of documents in a short time.

Thus, the image scanner 10 of the present preferred embodiment includes the document tray 11 on which the plural overlapped documents 14 are placed, the image scanning unit 46 arranged to scan the documents 14, the transfer unit 48 arranged to transfer the documents 14 on the document tray 11 one by one toward the image scanning unit 46, the lifting and lowering device 49 arranged to lift and lower the document tray 11, the height detection sensor 31 arranged to detect the upper surface height of the documents 14 stacked on the document tray 11, and the control unit 60 arranged to control the lifting and lowering device 49.

The transfer unit 48 transfers the documents 14 to lower the upper surface height of the documents 14, and the control unit 60 performs the control by selecting the control mode from the two kinds of the tray elevation control modes when the height detection sensor 31 is turned off. In the first control mode (S104 to S109), the transfer of the document 14 by the transfer unit 48 is interrupted (S104), the height detection sensor 31 detects that the upper surface height becomes higher than the predetermined height, the document tray 11 is further elevated by the predetermined distance until the upper surface height reaches the target height (S105 to S108), and the transfer unit 48 resumes the transfer of the document 14 (S109). On the other hand, in the second control mode (S110 to S116), while the transfer unit 48 continues the transfer of the documents 14 (S111 and S114), the document tray 11 is elevated until reaching the target height.

Therefore, the document tray 11 can be elevated by selecting the control mode from the two control modes, i.e., the first control mode in which the transfer (image scanning) of the document 14 is suspended and the transfer (scanning) is resumed after the document tray 11 is elevated, and the second control mode in which the document tray 11 is elevated while the transfer (scanning) of the document 14 is continued. As a result, the document tray 11 can properly be elevated according to the appropriate circumstances.

In the image scanner 10 of the present preferred embodiment, the document scanning mode can be switched between the image-quality-priority scanning mode and the speed-priority scanning mode as a mode for scanning the documents. The control unit 60 controls the lifting and lowering device 49 in the first control mode (S104 to S109) when the document scanning mode is the image-quality-priority scanning mode, and the control unit 60 controls the lifting and lowering device 49 in the second control mode (S110 to S116) when the document scanning mode is the speed-priority scanning mode.

Therefore, in the image-quality-priority scanning mode, the document tray 11 can be elevated in the first control mode such that the elevation of the document tray 11 does not adversely affect the image quality during scanning the document. On the other hand, in the speed-priority scanning mode, the document tray 11 is elevated in the second control mode, so that the document can be efficiently scanned to complete the scanning work in a short time.

In the image scanner 10, when the height detection sensor 31 is turned off in the second control mode, the document tray 11 is elevated until the height detection sensor 31 is turned on, and the document tray 11 is further elevated by the predetermined additional elevating distance from the time the height detection sensor 31 is turned on, whereby the lifting and lowering device 49 is controlled such that the upper surface height reaches the target height (S113 to S116). In S113 of the second control mode, the additional elevating distance is computed and determined according to the document scanning speed.

In the second elevating mode, because the number of documents 14 transferred during elevating the document tray 11 depends on the document scanning speed, the additional elevating distance can be determined according to the number of documents 14. Accordingly, the upper surface height of the document 14 is substantially elevated to the target height irrespective of the document scanning speed, which allows the transfer unit 48 to smoothly transfer the documents 14.

Thus, the preferred embodiments and their modifications of the present invention are described above. Furthermore, the above configurations can be changed as follows.

The height detection sensor 31 is not limited to the sensor which is turned on as long as the pickup roller 22 is not lower than the predetermined height, but a sensor which is turned off as long as the pickup roller 22 is not lower than the predetermined height may be used as the height detection sensor 31.

In the height detection sensor 31, the upper surface height of the document 14 preferably is indirectly detected by detecting the height of the pickup roller 22. Alternatively, the upper surface height of the document 14 may directly be detected.

The tray lifting and lowering motor 15 is not limited to a stepping motor, but the tray lifting and lowering motor 15 may be a servo motor.

The configuration in which the document tray is elevated is not limited to the image scanner in which the document transportation path 21 is formed in a curved shape (C-shape) as illustrated in FIG. 1. For example, the configuration in which the document tray is elevated can be applied to an image scanner, in which a horizontal document transportation path is provided and the document is fed from one side of the apparatus and discharged to the opposite side. The present invention is not limited to an image scanner, but can be applied to an automatic document feeder type copying machine including a large-capacity document tray.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. An image scanning apparatus comprising:
a document tray arranged to receive a plurality of documents;
an image scanning unit arranged to scan the documents;
a transfer unit arranged to transfer the documents on the document tray one by one toward the image scanning unit;
a lifting and lowering device arranged to lift and lower the document tray;
a height detection sensor arranged to detect an upper surface height of the documents stacked on the document tray; and
a control unit arranged to control the lifting and lowering device; wherein
the control unit controls the lifting and lowering device while switching between a first control mode and a second control mode; and the height detection sensor detects that the transfer unit has transferred the documents so as to lower the upper surface height of the documents to below a predetermined height such that:

in the first control mode, the control unit suspends the transfer of the document by the transfer unit, the control unit elevates the document tray until the upper surface height reaches a target height that is higher by a predetermined distance than when the height detection sensor detects that the upper surface height becomes higher than the predetermined height, and the control unit resumes the transfer of the document by the transfer unit; and in the second control mode, the control unit elevates the document tray until the document tray reaches the target height, while the transfer unit continues the transfer of the document.

2. The image scanning apparatus according to claim 1, wherein a document scanning mode can be switched between an image-quality-priority scanning mode and a speed-priority scanning mode as a mode for scanning the document;

in the image-quality-priority scanning mode, the control unit controls the lifting and lowering device in the first control mode; and in the speed-priority scanning mode, the control unit controls the lifting and lowering device in the second control mode.

3. The image scanning apparatus according to claim 2, wherein, the height detection sensor detects that the transfer unit has transferred the documents so as to lower the upper surface height to below a predetermined height;

in the second control mode, when the control unit elevates the document tray and the height detection sensor detects that the upper surface height becomes higher than the predetermined height, the control unit further elevates the document tray by a predetermined additional elevating distance, and the control unit controls the lifting and lowering device such that the upper surface height reaches the target height; and the additional elevating distance is determined according to a document scanning speed.

4. An image scanner including the image scanning apparatus according to claim 3.

\* \* \* \* \*